Figure 1A:
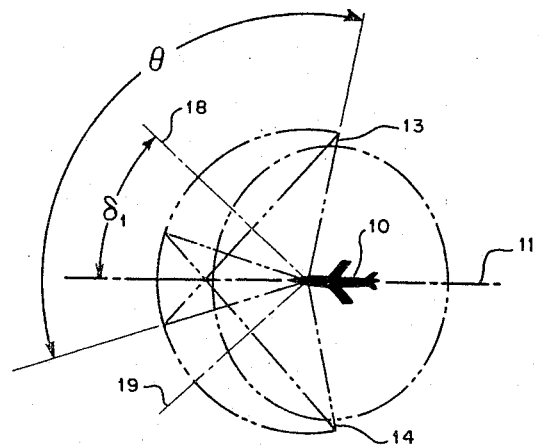

Feb. 28, 1967   H. W. MILLER ETAL   3,306,557
APPARATUS FOR PASSIVE DEFENSE FROM EXPLOSIONS
Filed March 31, 1961   2 Sheets-Sheet 1

INVENTORS
HAROLD W. MILLER
JOSEPH TURCO
BY BERNARD ZASLAV

ATTORNEY

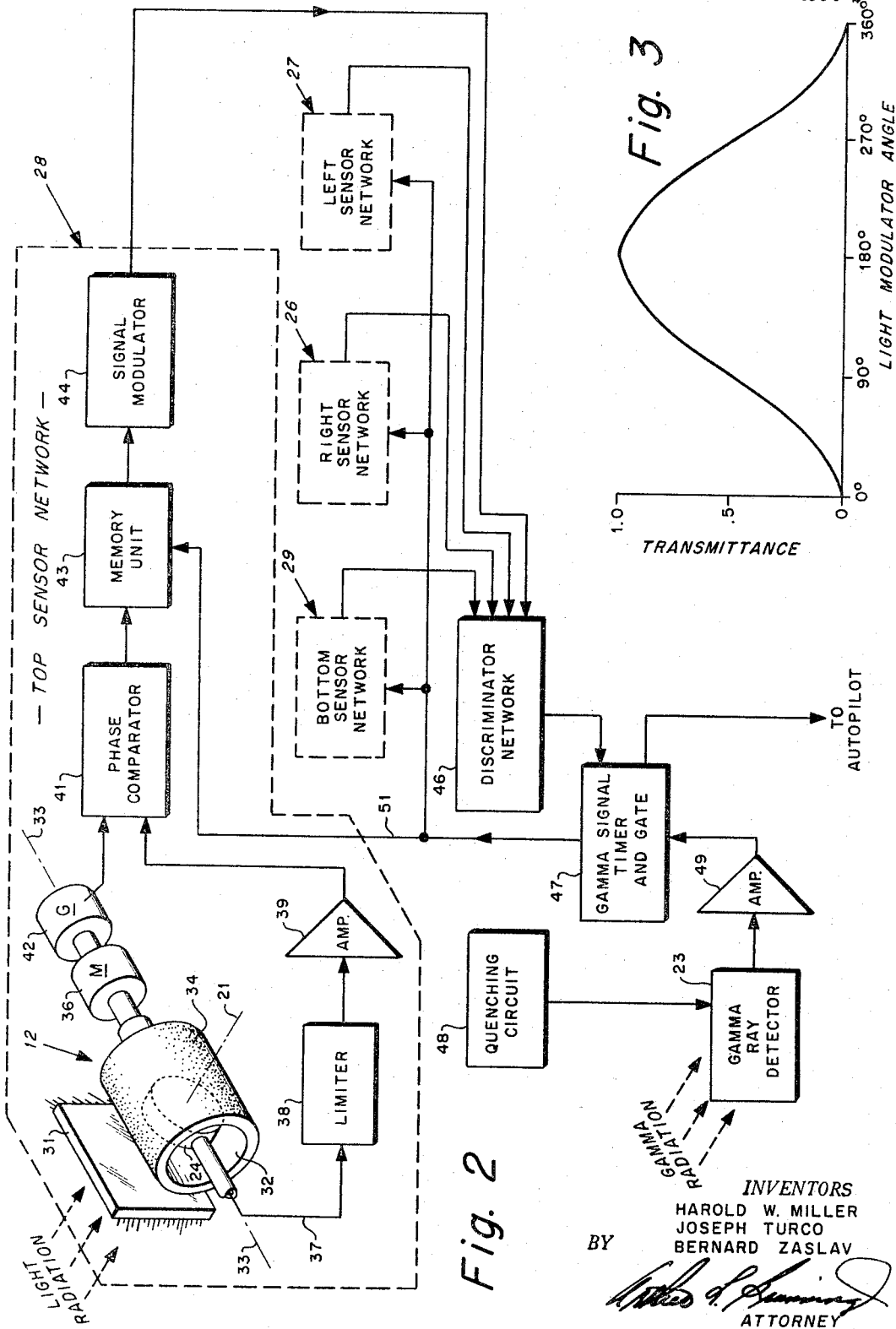

United States Patent Office 3,306,557
Patented Feb. 28, 1967

3,306,557
APPARATUS FOR PASSIVE DEFENSE
FROM EXPLOSIONS
Harold W. Miller, Point Pleasant, Joseph Turco, Ambler, and Bernard Zaslav, Elkins Park, Pa., assignors to the United States of America as represented by the Secretary of the Navy
Filed Mar. 31, 1961, Ser. No. 99,968
9 Claims. (Cl. 244—77)

The invention described herein may be manufactured and used by or for the Government of the United States of America for governmental purposes without the payment of any royalties thereon or therefor.

The present invention relates to apparatus for the passive defense of an aircraft in flight from a near-miss nuclear burst and more particularly to apparatus for producing a signal indicative of the direction from an aircraft to a near-miss nuclear burst, for confirming the signal as being from a nuclear burst, and for applying the confirmed signal to flight controls of the aircraft for maneuvering the aircraft into a position which is least vulnerable to the sudden gust generated by the burst before the gust arrives at the aircraft.

The present invention is an improvement over the device shown in application Serial No. 97,701 of Joseph Brown for "Method and Apparatus for Passive Defense from Nuclear Explosions" filed March 22, 1961, now abandoned.

One of the most significant causes of damage to aircraft produced by a near-miss nuclear burst is the sudden gust loading imparted upon the surfaces of the aircraft from air blast generated at the burst region. This type of loading can produce an immediate type of "kill" at greater distances than produced by other causes of aircraft damage such as nuclear or thermal radiation. As might be expected, the ability of aircraft to withstand a high sudden gust loading will vary with the kind of aircraft and for different aspects of the aircraft facing the direction of a nuclear burst. A study of various types of aircraft indicates generally that minimum vulnerability occurs when the aircraft wings lie substantially in a plane formed by the velocity vector of the aircraft and the point of explosion of the nuclear weapon.

Essentially, application Serial No. 97,701 supra, discloses gamma radiation responsive means which transmits a command signal to the flight controls of an aircraft in order to orient the aircraft into a position of minimum vulnerability with respect to the direction to a source of gamma radiation. It has been observed, however, that at great distances from the radiation source, the direct gamma radiation becomes less discernible from the background radiation level due to scattering and therefore directivity to the source is more difficult to measure even though the aircraft may still be within the lethal envelope of a nuclear burst. This may be attributable to the short wave length of gamma radiation. An extremely sensitive gamma radiation detector is therefore required for long-range effectiveness, but such a detector at close range to a nuclear burst may be subjected to such high radiation concentrations that it would be utterly incapable of measuring direction with any precision and reliabilty. Radiation in the light spectrum, on the other hand, has a range of relatively long wave lengths and the direct radiation will remain distinct and easily discernible at distances beyond the lethal envelope. Since a nuclear burst also generates bright light energy, light radiation therefore provides an excellent primary source of directivity information to the burst.

Accordingly, it is an object of the present invention to provide apparatus responsive to light energy for producing a signal indicative of the direction from an aircraft to a source of light radiation, which is responsive to nuclear radiation for confirming the light energy signal as being from a nuclear burst, and which will apply the confirmed light energy signal to flight controls of the aircraft for maneuvering the aircraft into a position which is least vulnerable to the sudden gust generated by the burst before the gust arrives at the aircraft.

Another object of the invention is to provide a device responsive to the light energy from a transient source with which a signal is produced indicative of the direction to the source, and with which the directional signal is interpreted and modulated into a form adaptable as an input to conventional automatic pilot systems.

It is a further object of the invention to provide overriding flight control apparatus which may be conveniently added to an existing aircraft flight control system without greatly altering the present construction thereof, which may be rendered effective or ineffective as desired, and which will be relatively simple, compact, convenient, practical and inexpensive.

Various other objects and advantages will be apparent from the following description of one embodiment of the invention, and the novel features will be particularly pointed out hereinafter in connection with the appended claims.

Figure 1B:
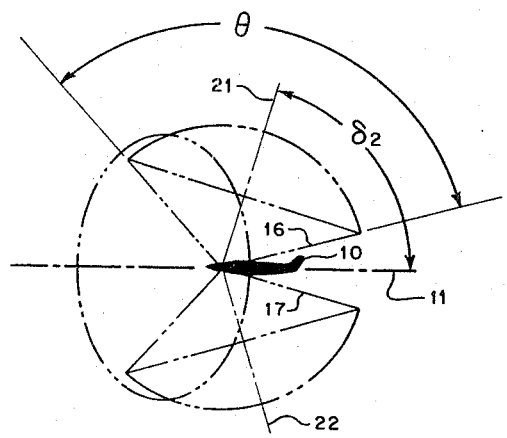
Figure 1C:
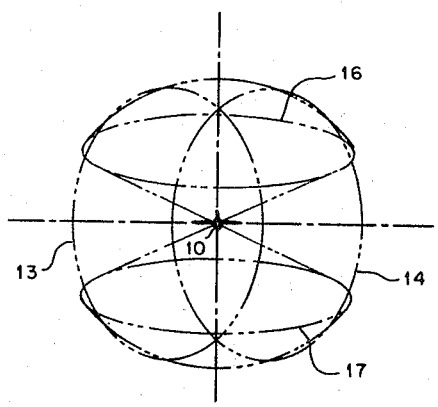

In the accompanying drawing:

FIGS. 1a, 1b, and 1c represent plan, side and front views, respectively, of an aircraft superimposed by profiles of the fields of view of light energy sensors mounted thereon;

FIG. 2 is a composite schematic and block diagram of all of the main elements and the electrical circuits therebetween of the apparatus; and FIG. 3 is a graphical illustration of the relative transmittance of a light energy modulator drum shown in FIG. 2.

In the illustrated embodiment, FIGS. 1a, 1b and 1c show, in plan, elevation and front views, an aircraft 10 having a longitudinal axis 11 moving from right to left. Light detectors 12, FIG. 2, are optimally mounted on the aircraft 10 so as to survey a maximum field about the aircraft 10. Each of the detectors 12 has its own viewing field, hereinafter identified as right, left, top and bottom fields and illustrated in FIGS. 1a, 1b and 1c as circular cones 13, 14, 16 and 17, respectively. The cones 13, 14, 16 and 17 have their vertices at the respective detectors 12. The number of detectors 12 required on the aircraft 10 is determined by the vertex angle $\theta$ of the cones 13, 14, 16 and 17 to assure substantially complete surveillance. In the illustrated embodiment, a vertex angle $\theta$ of 120 degrees is selected using four of the detectors 12. Symmetrical axes 18 and 19 of cones 13 and 14 lie in the horizontal plane of the aircraft 10 and are displaced in opposite directions from the forward end of the longitudinal axis 11 by an angle $\delta$, optimally chosen as 45 degrees. Symmetrical axes 21 and 22 of cones 16 and 17 lie in the vertical plane of the aircraft 10 and are displaced in opposite direction from the aftward end of the longitudinal axis 11 by an angle $\delta_2$ optimally chosen as 75 degrees. It is understood, of course, that variations in the orientation of the fields of view and the number of detectors 12 on aircraft 10 are contemplated, and therefore it is not intended that the invention be limited to the example illustrated.

An omnidirectional gamma ray detector 23, FIG. 2, also fixed on the aircraft 10, responds to gamma radiation from all directions.

The light energy detectors 12 form a part of right, left, top and bottom sensor networks 26, 27, 28 and 29, respectively. Being identical in construction, only the details of the top sensor network 28 will be discussed.

The detector 12 includes an element 24 having a photosensitive planar surface facing a light filter 31 for receiving all of the radiation in the light spectrum from the field of view defined by the circular cone 16, the symmetrical axis 21 being normal to the planar surface of the element 24. The element 24 and the filter 31 are fixed against movement relative to aircraft structure. The choice of filter 31 will depend on the particular light rays to be absorbed and the extent of attenuation required of other rays, generated by the light source to be detected. By such a choice, it is thus possible to render the element 24 non-responsive to extraneous light sources.

A light modulator 32 having a hollow cylindrical configuration encircles the element 24 so that a portion of its cylindrical wall is interposed between the filter 31 and the element 24. The cylindrical axis 33 of the light modulator 32 is parallel to the horizontal plane of the aircraft 10 and normal to the symmetrical axis 21. In networks 26, 27 and 29, the cylindrical axes are normal to the symmetrical axes 18, 19 and 22, respectively. The light modulator 32 is constructed of a transparent material with an opaque material 34 deposited on its outer surface at a constant density from end to end but at a density which gradually varies from complete opaqueness to complete transparency at diametrically opposite portions of the wall. The variation in light transmittance of the light modulator 32 is illustrated graphically in FIG. 3 wherein complete opaqueness or zero transmittance is arbitrarily taken as 0 degrees on light modulator 32. As the light modulator 32 rotates about its cylindrical axis 33, the light transmitted through its wall from a stationary light source at 0 degrees increases as a sin function to unity or 100 percent transmittance at 180 degrees. Continued rotation reduces the transmittance as a sin function again to zero transmittance at 360 degrees. The light modulator 32 is coaxially coupled to a constant speed motor 36, so that for a continuous source of light at constant intensity, the light intensity at the element 24 will be modulated as a sin function. It is contemplated that the transmittance may be varied in sin function for frequencies greater than one per revolution with the obvious result of increasing the rate of light modulation for a given speed of motor 36. The modulated light signal appears at the output 37 of the element 24 as an electrical voltage varying as a sin function at a constant frequency.

The element output 37 is connected to the input of a limiter 38, such as the zener diode type, which maintains a constant signal level (peak-to-peak) output irrespective of the amplitude on the output 37. The output of the limiter 38 is connected through an amplifier 39 to one input of a phase comparator 41. The constant speed motor 36 is further mechanically coupled to a reference signal generator 42 for rotation therewith for generating a sinusoidal reference signal synchronous with the rotation of the light modulator 32. The generator 42 is angularly aligned so that there is no phase difference between the reference signal and the element output 37 when the source of light lies in a normal reference plane formed by the cylindrical axis 33 and the symmetrical axis 21. Any deviation of the light source from this normal reference plane will produce a proportional phase difference between the output 37 and the reference signal from generator 42. The direction of the deviation will also produce a lead or lag in phase of the output 37 relative to the reference signal. The output of generator 42 is connected to another input of the phase comparator 41 for determining this phase relationship. Hence, the output signal from the phase comparator 41 is a D.C. signal having a magnitude indicative of both the direction and amount of the deviation of the light source from the normal reference plane.

The phase comparator 41 output is delivered to a memory unit 43 which is provided to store the signal and discharge the signal at a slow rate. These functions may be performed, for example, by capacitors installed across the input of the memory unit 43 which charge rapidly to the peak voltage from the phase comparator 41 and then discharge slowly as the charge is removed at the output of the memory unit 43. The memory unit 43 output is connected to the input of a signal modulator 44 wherein a controlled-carrier signal has its voltage modulated as a function of the signal from the memory unit 43 suitable for operating conventional automatic pilot equipment. For example, the signal modulator 44 may be a vibrating reed type of chopper having its coil energized by an A.C. power supply system in the aircraft and having its contacts connected to the output from the memory unit 43. The output signal from such a chopper has a square wave form and may require a filter circuit to remove any harmonics produced thereby. The output of the signal modulator 44 is connected to one input of a discriminator network 45.

The right, left and bottom sensor networks 26, 27 and 29, being identical to the top sensor network 28, except as noted, also have their outputs connected to other inputs of the discriminator network 46. The network 46 may be of conventional design adapted for allowing the strongest input signal to appear at its output.

The output of the discriminator network 46 is connected through a gamma signal timer and gate 47 to the automatic pilot equipment which, in turn, will execute a "roll" command to the flight controls of the aircraft 10 when a signal appears at the output of network 46 and when the timer and gate 47 passes the signal. Operation of the timer and gate 47 is initiated by the gamma ray detector 23.

The gamma ray detector 23 is conveniently located on the aircraft 10 so that it can survey the same fields of view as the light detectors 12. For practicing the invention, other types of detectors are contemplated such as a neutron detector. However, gamma radiation permits use of a Geiger-Mueller tube which is particularly suited for use on an aircraft. With a Geiger-Mueller type gamma ray detector 23, a quenching circuit 48 is provided for limiting the pulse duration of each ionizing event so that a greater resolution in the number of ionizing events per unit of time is obtained, there being very high amounts of radiation usually present in near-miss nuclear bursts. The output from the gamma ray detector 23 is connected to a control input of the gamma signal timer and gate 47 through a gamma signal amplifier 49. When the gamma signal impressed on the control input reaches a predetermined amount or threshold, a gating circuit in the timer and gate 47 passes the light signal at the output of the discriminator network 46 to the automatic pilot. When the gamma signal on the control input falls below a predetermined amount, a timing event is initiated which maintains the gating circuit closed for a predetermined time after which the light signal to the automatic pilot is terminated. Thus, the gating circuit of the timer and gate 47 passes the light signal for the interval of gamma signal above the threshold plus the timing event. The timer and gate 47 may be of any conventional circuit design. For example, the control input may simply short-circuit a capacitor connecting to the grid of a tube which operates a relay. The short-circuit removes any negative bias from the grid allowing the relay to close the gating circuit. Thus, when the control input drops below the threshold amount, the short circuit is removed from the capacitor and it begins to charge. At the end of the predetermined time interval, the grid is again negatively biased and the relay returns to its original state.

Obviously, if another gamma signal is impressed on the input of the timer and gate 47 before the timer has completed its cycle, another timing event is initiated when the gamma signal terminates.

An interlock circuit 51 between the timer and gate 47 and the memory unit 43 provides a means for discharging the residual light signal stored in the memory unit 43 when the timing event is terminated. For example, a contact on a relay in the timer and gate 47 may simply discharge memory capacitors in the memory unit 43. The circuit 51 thereby conditions the memory unit 43 for receiving a subsequent light signal.

Operation of the apparatus is summarized as follows. Assuming a nuclear burst occurs near the aircraft 10 in its top field of view defined by the cone 16, the light radiation is instantly received at the filter 31 which is selected to transmit light waves predominantly manifested by the nuclear burst to the exclusion from extraneous light energy sources. The filtered light is then modulated as a sin function from zero to maximum at a frequency determined by the constant-speed revolving light modulator 32. The modulated light signal at the photosensitive element 24 is converted into a modulated D.C. signal at the output 37 where it is further modified by the limiter 38 and amplifier 39. The generator 42 produces a reference signal of sin function and of equal frequency as the modulated light signal. The reference signal and the modulated light signal are compared as to phase relationship at the phase comparator 41. A signal, appearing at the output of the comparator 41 as a function of the deviation of the light source from a reference plane in the aircraft 10, is stored in the memory unit 43. When the gamma signal timer and gate 47 is actuated, the memory unit 43 slowly discharges the stored light signal to the signal modulator 44 where it is modified in form suitable for executing a "roll" command in the automatic pilot consistent with the amount of roll required to orient the aircraft 10 into its least vulnerable aspect to the nuclear burst. The output of the signal modulator 44 or top sensor network 28 is compared in the discriminator network 46 with the outputs of the right, left and bottom networks 26, 27 and 29. Being of strongest signal strength, the output of the network 28 will pass through the gating circuit of the timer and gate 47 onto the automatic pilot. For example, to operate the automatic pilot system of U.S. Patent 2,393,892 to C. De Ganahl issued January 29, 1946, the frequency of the output signal from each sensor network 26-28 should be distinct from the others to command right or left roll. Conventional automatic control and follow-up techniques may then be employed to effect roll an amount proportional to the amplitude of the particular command signal.

Substantially at the same time the light energy reaches the light detector 12, gamma radiation from the nuclear burst arrives at the gamma ray detector 23. The gamma radiation is converted into an amplified control signal and is applied to the control input of the gamma signal timer and gate 47. If the control signal is above the predetermined threshold amount, the gating circuit will pass the light signal to the automatic pilot, thus confirming the particular light source detected as having gamma radiation. The aircraft 10 will thereafter maneuver so that its least vulnerable aspect faces the direction of the light source and maintain such a position for a duration, determined by the timing event, to allow the gust generated by the nuclear burst to pass the aircraft 10. Usually, the gamma signal is a very short pulse so the gating circuit will open in substantially the duration of the timing event. However, if the gamma radiation level around the aircraft 10 is high enough to produce an extended gamma signal at the control input of the timer and gate 47, the timing event is delayed for this interval.

A second nuclear burst before the first timing event is complete will recycle the timer and gate 47 while the gating circuit remains closed. Thus, a continuous light signal is maintained to the automatic pilot in the presence of a series of closely spaced nuclear bursts.

At the end of the timing event, the gating circuit in the timer and gate 47 is opened and the residual light signal in the memory unit 43 is removed by the interlock circuit 51. Normal aircraft flight control is then resumed.

It should be apparent from the foregoing that the present invention affords an increase in the survival probability of an aircraft to near-miss explosions without unnecessarily overriding normal flight controls unless the explosion appears to be of a nuclear character.

It will be understood that various changes in the details, materials, and arrangement of parts, which have been herein described and illustrated in order to explain the nature of the invention, may be made by those skilled in the art within the principle and scope of the invention as expressed in the appended claims.

What is claimed is:

1. Apparatus for the passive defense of an aircraft in flight from a near-miss nuclear burst, the aircraft being of a type equipped with automatic pilot means, comprising: a plurality of light radiation responsive detectors adapted to be mounted at spaced intervals around the periphery of the fuselage of the aircraft for producing light signals indicative of the direction to a light source, a plurality of memory units each having an input respectively connected to one of said detectors for receiving and storing each of said light signals, a discriminator network having a plurality of inputs respectively connected to each of said memory units for receiving said stored light signal for transmitting the strongest of said light signals to an output, a gamma radiation responsive detector adapted to be mounted on the aircraft for producing a gate signal indicative of gamma radiation, gating means having a first input connected to said gamma radiation detector for receiving said gate signal and a second input connected to said discriminator network for receiving and passing said strongest light signal to an output which is adapted to be connected to the input controls of the automatic pilot of the aircraft when said gate signal exceeds a predetermined threshold amount, timer means having an input connected to said gamma radiation detector and operatively connected to said gating means for interrupting said strongest light signal to the automatic pilot after a predetermined duration, said timer further including reset means connected to each of said memory units for discharging the residual stored light signal after said duration; whereby the aircraft is maneuvered to and maintained in its least vulnerable aspect with respect to a nuclear burst before the gust generated by the burst arrives at the aircraft.

2. Apparatus for the passive defense of an aircraft in flight from a near-miss nuclear burst, the aircraft being of a type equipped with automatic pilot means, comprising: a plurality of radiation responsive detectors adapted to be mounted at spaced intervals around the periphery of the fuselage of the aircraft, said detectors including a rotating cylindrical light modulator, a photosensitive element fixed against rotation within said modulator, and comparator means having inputs operatively connected to said modulator and element and an output for producing signals indicative of the direction to a radiation source, a plurality of memory units each having an input respectively connected to one of said detectors for receiving and storing each of said directional signals, a discriminator network having a plurality of inputs respectively connected to each of said memory units for receiving said stored directional signal for transmitting the strongest of said directional signals to an output, another radiation responsive detector adapted to be mounted on the aircraft for producing a gate signal indicative of radiation, gating means having a first input connected to said other radiation detector for receiving said gate signal and a second input connected to said discriminator network for receiving and passing said strongest directional signal to an output adapted to be connected to the input controls of the automatic pilot of the aircraft when said gate signal exceeds a predetermined threshold amount, timer means having an input connected to said other radiation detector and operatively connected to said gating means for interrupting said strongest directional signal to the automatic pilot after a predetermined duration; whereby the aircraft is maneuvered into its least vulnerable aspect with respect to a nuclear burst before the gust generated by the burst arrives at the aircraft.

3. Apparatus for the passive defense of an aircraft in flight from a near-miss nuclear burst, the aircraft being of a type equipped with automatic pilot means, comprising: a plurality of radiation responsive detectors adapted to be mounted at spaced intervals around the periphery of the fuselage of the aircraft, said detectors including a rotating cylindrical light modulator, a photosensitive element fixed against rotation within said modulator, and comparator means having inputs operatively connected to said modulator and element and an output for producing signals indicative of the direction to a radiation source, a plurality of memory units each having an input respectively connected to one of said detectors for receiving and storing each of said directional signals, a discriminator network having a plurality of inputs respectively connected to each of said memory units for receiving said stored directional signal for transmitting the strongest of said directional signals to an output, another radiation responsive detector adapted to be mounted on the aircraft for producing a gate signal indicative of gamma radiation, gating means having a first input connected to said other radiation detector for receiving said gate signal and a second input connected to said discriminator network for receiving and passing said strongest directional signal to an output adapted to be connected to the input controls of the automatic pilot of the aircraft when said gate signal exceeds a predetermined threshold amount; whereby the aircraft is maneuvered into its least vulnerable aspect with respect to a nuclear burst before the gust generated by the burst arrives at the aircraft.

4. Apparatus for meneuvering an aircraft from its normal flight attitude so that its least vulnerable aspect faces the direction of a nuclear burst, the aircraft being of a type equipped with automatic pilot means, comprising: light radiation responsive means adapted to be mounted on the aircraft for producing a sustained light signal indicative of the direction of radiation from a flash of light radiation, gamma radiation responsive means mounted on the aircraft for producing a gamma signal indicative of gamma radiation, gating means having one input connected to said light radiation responsive means for receiving said light signal and an output adapted to connect said light signal to the input controls of the automatic pilot of the aircraft, said gating means having another input connected to said gamma radiation responsive means for receiving said gamma signal and for selectively connecting said one input and said output of said gating means when said gamma signal reaches a predetermined threshold amount; whereby the aircraft will roll so that the wings are in the plane formed by the velocity vector of the aircraft and the center of the burst.

5. Apparatus for maneuvering an aircraft from its normal flight attitude so that its least vulnerable aspect faces the direction of a nuclear burst, the aircraft being of a type equipped with automatic pilot means, comprising: first radiation responsive means adapted to be mounted on the aircraft, said radiation responsive means including a rotating cylindrical light modulator, a photosensitive element fixed against rotation within said modulator, and comparator means having inputs operatively connected to said modulator and element and an output for producing a first sustained signal indicative of the direction of radiation from a momentary source, second radiation responsive means mounted on the aircraft for producing a second signal indicative of radiation, gating means having one input connected to said first radiation responsive means for receiving said first signal and an output adapted to connect said first signal to the input controls of the automatic pilot of the aircraft, said gating means having another input connected to said second radiation responsive means for receiving said second signal and for selectively connecting said one input and said output of said gating means when said second signal reaches a threshold amount; whereby the aircraft will roll so that the wings are in the plane formed by the velocity vector of the aircraft and the center of the burst.

6. Apparatus for maneuvering an aircraft from its normal flight attitude so that its least vulnerable aspect faces the direction of a nuclear burst, the aircraft being of a type equipped with automatic pilot means, comprising: first radiation responsive means adapted to be mounted on the airplane, said radiation responsive means including a rotating cylindrical light modulator, a photosensitive element fixed against rotation within said modulator, and comparator means having inputs operatively connected to said modulator and element and an output for producing a first signal indicative of the direction of radiation, second radiation responsive means mounted on the aircraft for producing a second signal indicative of radiation, gating means having one input connected to said first radiation responsive means for receiving said first signal and an output adapted to connect said first signal to the input controls of the automatic pilot of the aircraft, said gating means having another input connected to said second radiation responsive means for receiving and selectively connecting said input to said output of said gating means when said second signal reaches a threshold amount; whereby the aircraft is maneuvered so that the wings are in the plane formed by the velocity vector of the aircraft and the center of the burst.

7. Apparatus for the passive defense of a movable object from a near-miss nuclear burst, the object being of a type equipped with automatic maneuvering controls comprising: first means responsive to radiant energy of one predetermined wavelength range, said radiation responsive means including a rotating cylindrical light modulator, a photosensitive element fixed against rotation within said modulator, and comparator means having inputs operatively connected to said modulator and element and an output for producing a sustained signal indicative of the direction from the aircraft to a flash of light, second means responsive to radiant energy of another predetermined wavelength range for producing another signal, gating means operated by said other signal for selectively transmitting said sustained signal to the input of the automatic controls of the object; whereby the object will be maneuvered into its least vulnerable aspect with respect to the flash of light.

8. Apparatus for the passive defense of a movable object from a near-miss nuclear burst, the object being of a type equipped with automatic maneuvering controls comprising: first means responsive to radiant energy of one predetermined wavelength range, said radiation responsive means including a rotating cylindrical light modulator, a photosensitive element fixed against rotation within said modulator, and comparator means having inputs operatively connected to said modulator and element and an output for producing a sustained signal from a momentary radiation source, second means responsive to radiant energy of another predetermined wavelength range for producing another signal, third means operated by said other signal for selectively transmitting said sustained signal to the input of the automatic controls of the object; whereby the object will be maneuvered into its least vulnerable aspect with respect to the momentary radiation source.

9. Apparatus for the passive defense of a movable object from a near-miss nuclear burst, the object being of a type equipped with automatic maneuvering controls, comprising: first means responsive to energy of one wavelength range, said radiation responsive means including a rotating cylindrical light modulator, a photosensitive element fixed against rotation within said modulator, and comparator means having inputs operatively connected to said modulator and element and an output for producing a first signal from a radiation source, second means responsive to energy of another wavelength range for producing a second signal, third means operated by said second signal for transmitting said first signal to the input of the automatic controls of the object; whereby the object will be maneuvered into its least vulnerable aspect with respect to the radiation source.

References Cited by the Examiner

UNITED STATES PATENTS

| | | | |
|---|---|---|---|
| 1,948,552 | 2/1934 | Weber et al. | 250—196 |
| 2,700,318 | 1/1955 | Snyder | 250—203 X |
| 3,004,258 | 10/1961 | Cohen et al. | 250—106 |

FERGUS S. MIDDLETON, *Primary Examiner.*

CHESTER L. JUSTUS, BENJAMIN A. BORCHELT, SAMUEL FEINBERG, *Examiners.*

A. E. HALL, R. M. SKOLNIK, L. I. HALLACHER, *Assistant Examiners.*